July 8, 1924.
J. C. SHERRY
HANDHOLE CLOSURE
Filed Nov. 21, 1922
1,500,423
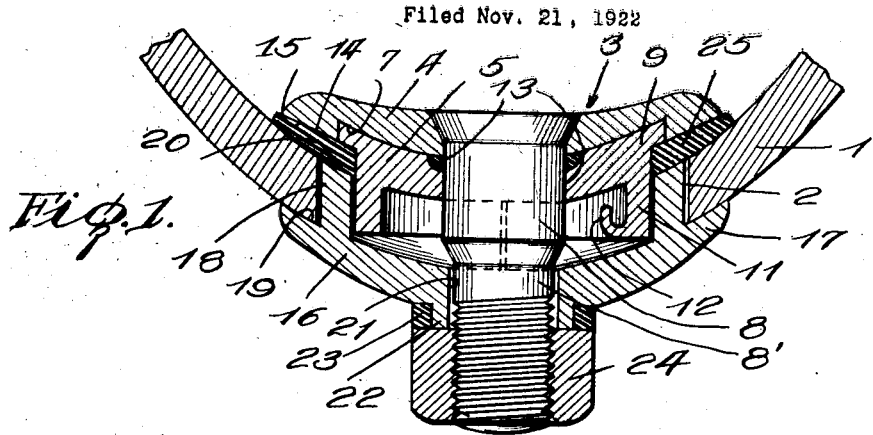
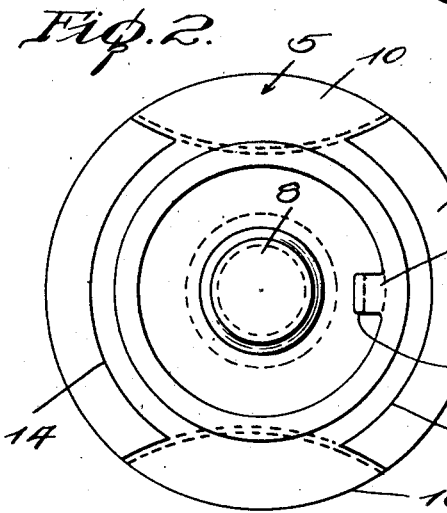
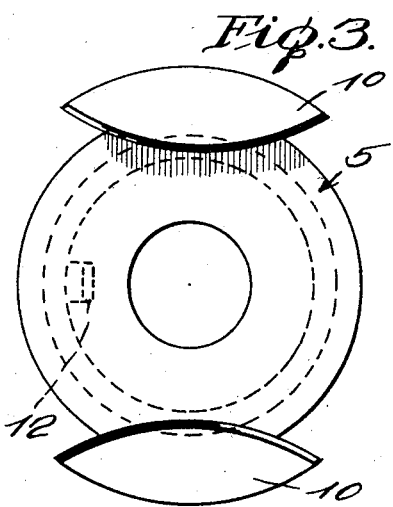
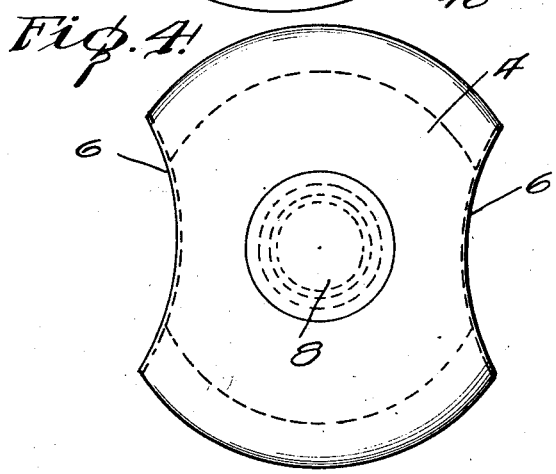
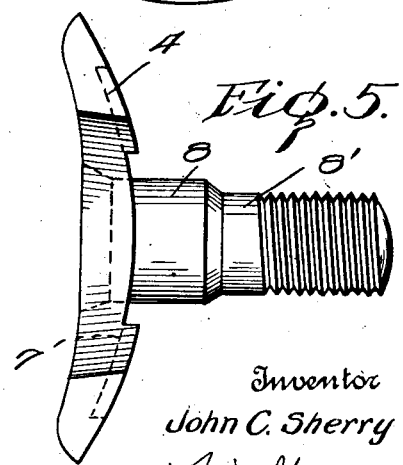
Inventor
John C. Sherry
Attorney Patented July 8, 1924.

1,500,423

UNITED STATES PATENT OFFICE.

JOHN C. SHERRY, OF SEATTLE, WASHINGTON.

HANDHOLE CLOSURE.

Application filed November 21, 1922. Serial No. 602,425.

*To all whom it may concern:*

Be it known that JOHN C. SHERRY, a citizen of the United States, residing at Seattle, in the county of King and State of Washington, has invented certain new and useful Improvements in Handhole Closures, of which the following is a specification.

This invention relates to hand hole closures, particularly adapted for closing hand holes in boilers and the like.

This invention is an improvement over the hand hole closure shown in my prior Patent, Number 1,304,391, dated May 20, 1919, in which the head member is formed of two parts, one part having a cylindrical portion fitting in the hand hole, provided with segmental legs fitting in corresponding recesses in the other part of the head, and forming therewith a cylindrical portion extending beyond the marginal edge of the hand hole to provide a bearing surface. The joint between the head parts opens along the peripheral edge of the part fitting in the hand hole and within the marginal edge of said hand hole, so that the sealing washer compressed between the bearing surface and the part adjacent the hand hole does not directly seal the joint between the head sections, and therefore leakage may occur through the hand hole and the joint of the head members.

In the present invention, the construction of the head sections brings the joint in the central portion of the bearing surface while the portion extending into the hand hole is substantially smaller than the hand hole to provide for the flange on the bridge member, also of improved construction, extending into the hand hole and presenting an edge overlying the joint in the head member for forcing the sealing member against the joint, while at the same time drawing the head toward it to compress the sealing member for sealing the joint between said head and the hand hole. These joints are in staggered relation and the sealing member effectively seals all the joints by the cooperation between the head and the bridge.

This invention is further adapted for use in hand holes in the rounded sections of a boiler or plate, as well as in straight portions through the use of the improved bridge.

A further improvement is the provision of the inclined bearing surface for confining the sealing member under the bearing surface and compressing it toward the hand hole, so that the maximum compression of the sealing member can be had and constantly maintained under the bearing surface of the head. With the ordinary flat bearing surface, the compression tends to force the sealing member outwardly beyond the edge of the bearing surface. This tendency not only occurs in applying the head but continues as long as the head is in place to a more or less extent ultimately permitting the joint to become open and leak.

In the drawings:

Fig. 1 is a sectional view showing the invention applied.

Fig. 2 is a bottom plan view of the head with the sections in interfitting relation.

Fig. 3 is a plan view of one of the head sections.

Fig. 4 is a plan view of the other head section.

Fig. 5 is a side elevation of the section shown in Fig. 4.

1 indicates a curved portion of a boiler wall provided with the hand hole 2 of cylindrical form.

The improved closure includes the head 3, which is made up of independent interfitting sections 4 and 5, the section 4 of which may be termed the stationary section, and the section 5 the movable section, for the purpose of distinction, the section 5 being moved with respect to section 4 during the insertion of the head through the hand hole. The stationary section 4 includes the major portion of the head, the circumference of which is larger than the hand hole and is provided with cutaway portions 6 extending entirely through the head at opposite points. This section is also formed with a recess 7 in the bottom face and a tapered opening to receive the tapered head of a stud 8 having a reduced threaded extension 8', the recess 7 receiving the head portion 9 of the movable section, which is provided with segmental projections 10 adapted to fit the cutaway portions 6 and provide a complete head structure. The movable section 5 is formed with a cylindrical projection 11 extending from the head portion 9 and of smaller diameter than said head portion, and which is adapted to extend into the hand hole, the edge of the cylindrical portion being provided with a hook 12 for a purpose to be described. The head portion 9 is also provided with an opening 13 and an annular recess to receive the stud 8, and a packing washer 13' in the recess, and is smaller in diameter than the hand hole, so that in assembled relation, the head sections have a joint of segmental form as indicated at 14 extending through the bearing surface 15 and located within the marginal edge of the hand hole. This bearing surface is inclined with respect to the axis of the head and the joint between the head sections extends from the ends of the segmental portions 14 outwardly through the outer edge of the bearing surface.

A bridge formed of two sections 16 and 17 is formed with an annular flange 18 adapted to extend through the hand hole over the cylindrical portion 11, which provides a shoulder 19 to engage the wall of the boiler around the hand hole. The flange 18 presents an edge 20 opposed to the bearing surface and overlies the segmental joint of the head sections. The bridge sections are formed with an opening 21 and an annular flange 22 projecting therefrom around the opening for receiving the securing ring 23, which holds the bridge sections in assembled relation. The stud 8 in the stationary head section extends through opening 21 and receives a nut 24 which when screwed on the stem engages flange 22 and draws the head toward the bridge for compressing the sealing ring or washer 25 to seal the hand hole against leakage of the contents of the boiler.

To insert the head through the hand hole, the movable section is placed on the stud with the projections 10 arranged at right angles to the normal position thereof, whereupon the head can be tilted and inserted through the hand hole. A wire or rod is then engaged in the hook on the movable section, which is turned thereby to bring the projections 10 in line with the corresponding recesses in the stationary head when the section is pushed further on the head into interfitting relation with the stationary head. In this relative position of the parts, the head cannot be drawn through the hand hole.

The bridge sections are then inserted in place and the ring 23 placed over the flange 22 for holding them in place, it being understood that the sealing element 25 was inserted with the movable head section. The nut 24 is now threaded on the stud and turned up tightly against flange 22 when the joint will be effectively sealed. As the nut is threaded on drawing the head sections together, the stud and sections will compress the packing 13' to seal the joint around said stud.

The edge 20 of the flange 18 in overlying the segmental joint 14 forces the sealing element 25 against the joint and effectively seals it against leakage, while the bridge member draws both sections of the head toward it and seals the joint between the bearing surface and the wall of the boiler.

The inclined bearing surface causes the sealing element to be compressed toward the axis of the head and effectively confines it between said surface, the wall of the boiler, and the edge of the flange.

The bridge is applicable to any hand hole in a boiler, whether the surface of the wall at the point be curved or straight because the shoulder 19 engages the margin of the hand hole and the curvature of the wall will not affect its positioning. By forming it of two parts, it is more easily inserted in the hand hole and secured with its component parts.

What I claim is:—

1. A hand hole closure having a head made up of independent sections adapted in one relative position to permit the insertion of the head through the hand hole and in another position to prevent movement of the head through the hand hole, the joint between said sections when in the latter position being disposed inwardly of the marginal edge of the hand hole, a bridge to engage the surface about the hand hole in opposition to the head and having a flange to fit within the marginal edge of the hand hole, the free edge of the flange extending in both directions beyond the joint between the head sections, and means for drawing said head and bridge toward each other, whereby said flange edge may act through an interposed sealing element to seal said joint.

2. A hand hole closure having a head made up of separable sections adapted in one relation to be inserted through the hand hole and in another relation to be prevented from moving through the hand hole, said sections when in the latter position presenting a bearing surface to rest on and extend in both directions beyond the marginal edge of the hand hole, the joint between the sections opening through this bearing surface inwardly of the marginal edge of the hand hole, and means to fit within the marginal edge of the hand hole in opposition to said bearing surface and substantially covering the joint between the sections, whereby a gasket resting against said bearing surface and between said surface and said means will simultaneously seal the joint about the head and the joint between the sections.

3. A hand hole closure, including a head made up of separable sections, the joint between the sections when assembled being completely exposed within the margin of the hand hole, and means to exert a pressure relative to said head in line with and in both directions beyond said joint, to thereby provide for sealing said joint when the parts are assembled.

4. A hand hole closure having a head, composed of separable interfitting sections, adapted in one relative position to permit the insertion of the head through the hand hole and in another position to prevent movement of the head through the hand hole, said sections in the last mentioned relation presenting a substantial bearing surface to rest on and extend in all directions beyond the margin of the hand hole, said sections also presenting a plurality of joints opening through said bearing surface inside the marginal edge of the hand hole, and means having a bearing on the outer margin of the hand hole extending through the hand hole and overlying said joints for exerting a pressure relative to the head to provide for sealing said joints and to provide for sealing the joint of the bearing surface of the head beyond the margin of the hand hole.

5. A hand hole closure having a head, composed of separable sections adapted in one relative position to permit the insertion of the head through the hand hole and in another position to prevent movement of the head through said hole, said sections in the last-mentioned position presenting a substantial bearing surface to rest on and extend beyond the marginal edge of the hand hole, the joint between the sections opening through the bearing surface inside the marginal edge of the hand hole in opposed segments and extending radially from the ends of the segmental portions through the outer edge of the bearing surface beyond the margin of the hand hole, a bridge having a flange extending through the hand hole with the edge overlying said segmental sections and the radial portions of the joint within the hand hole, and means for drawing the bridge and head toward each other to provide for sealing the segmental and radial joints and the joint between the hand hole and the bearing surface.

6. A hand hole closure, comprising a head made of separable sections adapted in one relative position to permit insertion of the head through a hand hole formed in a wall and in another relative position to prevent movement of the head through said hand hole, said sections in the last-mentioned relation being formed to present a substantial bearing surface to rest on the plate and inclined from its inner to its outer edge and extend beyond the margin of the hand hole in all directions, and means for drawing the head towards the plate for compressing a sealing element between the bearing surface and the plate towards the margin of the hand hole.

7. A hand hole closure, comprising a head made up of separable sections adapted in one relative position to permit insertion of the head through the hand hole and in another relative position to prevent movement thereof through said hand hole, said sections in the last-mentioned relation presenting a bearing surface extending beyond the marginal edge of the hand hole in all directions, a bridge formed of independent cooperable parts adapted to engage the margin of the hand hole and extend beyond the edge thereof, means for securing said bridge parts in cooperative relation, and means for drawing the head and bridge toward each other to provide for sealing the joint between the bearing surface of the head and the margin of the hand hole.

8. In a hand hole closure, a sectional head, and means to clamp the head in closure forming position, said means including a portion adapted to exert pressure in line with the joint between the sections of the head.

9. A hand hole closure, including a head made up of sections, and means cooperating in the securing of the head in place to present a section in line with and capable of exerting pressure on the joint between the sections of the head.

10. A hand hole closure, including a head made up of separable sections, a sealing member overlying and extending in both directions beyond the joint between the sections, and means for creating a pressure directly on said sealing member.

11. A hand hole closure, including a head made up of separable sections, a sealing member overyling and extending in both directions beyond the joint between the sections, and clamping means for the head having a portion to directly engage the sealing means and exert pressure on the same overlying and in both directions beyond said joint.

In testimony whereof I affix my signature.

JOHN C. SHERRY.